J. W. M. KIRKPATRICK, OF HAMBURG, ARKANSAS.

Letters Patent No. 86,986, dated February 16, 1869.

IMPROVED MEDICAL COMPOUND.

The Schedule referred to in these Letters Patent and making part of the same.

*To all whom it may concern:*

Be it known that I, J. W. M. KIRKPATRICK, of Hamburg, in the county of Ashley, and State of Arkansas, have invented a new and improved Medical Compound; and I do hereby declare that the following is a full, clear, and exact description thereof, which will enable others skilled in the art to make and use the same.

This invention consists in the combination of the several ingredients herein set forth, whereby an effective specific for the treatment of fever and ague is obtained.

The usual proportions are determined from the following recipe:

R. Fluid extract of vervain, (U. S.,) five gallons.
Extract of licorice, eleven and a half pounds.
Proof alcohol, one gallon.
Oil of sassafras, eleven ounces.
Oil of anise, one ounce.
Oil of partridge-berry, (*Gaultheria procumbens,* U. S.,) one ounce.
Mistura.

Dose: For male adult, one table-spoonful; for female adult, three-quarters of a table-spoonful; for children, one-half table-spoonful.

The extract of vervain, (wild hyssop,) I usually prepare as follows:

I take the entire plants, root, stem, and leaves, and cover them with water, in any suitable vessel, in which the plants are loosely packed, and let remain for twelve hours.

I then remove the mass to a still, or suitable vessel for boiling it, until the strength is fully extracted, keeping the plants covered with water during the boiling-process. The decoction is then strained, and concentrated by reboiling. The degree of concentration may be determined by the following proportion:

The decoction obtained from boiling thirty gallons of the mass (water and plants together, as aforesaid,) is boiled down to five gallons, when two and a half pounds of extract of licorice are added after the decoction is cooled. Again strain, to eliminate the residual matter.

This compound may be reasonably varied as to its proportions, without materially affecting its curative quality, but I have set forth what I deem to be the best formula of preparation.

Having thus described my invention,

I claim as new, and desire to secure by Letters Patent—

The compound of matter, substantially as herein set forth.

The above specification of my invention signed by me, this 16th day of October, 1868.

J. W. M. KIRKPATRICK.

Witnesses:
W. F. McCOMBS,
S. C. BOLLING.